(12) United States Patent
Herbermann et al.

(10) Patent No.: US 6,416,273 B1
(45) Date of Patent: Jul. 9, 2002

(54) TOOL MOUNT FOR MOVING ELEMENTS

(75) Inventors: Alfred F. Herbermann, Ann Arbor; Jacob J. Van't Land, Ypsilanti; Michael A. Filipiak, Ann Arbor, all of MI (US)

(73) Assignee: Syron Engineering & Manufacturing, LLC, Saline, MI (US)

( * ) Notice: Subject to any disclaimer, the term of this patent is extended or adjusted under 35 U.S.C. 154(b) by 0 days.

(21) Appl. No.: 09/812,700

(22) Filed: Mar. 20, 2001

Related U.S. Application Data

(63) Continuation of application No. 09/296,163, filed on Apr. 21, 1999, now Pat. No. 6,244,814, which is a continuation of application No. 09/046,504, filed on Mar. 17, 1998, now Pat. No. 5,909,998, which is a continuation of application No. 08/546,940, filed on Oct. 23, 1995, now Pat. No. 5,746,567, which is a continuation-in-part of application No. 08/353,920, filed on Dec. 12, 1994, now Pat. No. 5,733,097.

(51) Int. Cl.7 .............................................. B65G 65/100
(52) U.S. Cl. .................. 414/751.1; 414/749.1
(58) Field of Search .......................... 414/749.1, 752.1, 414/751.1; 295/65; 901/16

(56) References Cited

U.S. PATENT DOCUMENTS

| | | |
|---|---|---|
| 3,542,412 A | 11/1970 | Koch |
| 4,648,786 A | 3/1987 | Sakurai |
| 4,685,714 A | 8/1987 | Hoke |
| 4,725,193 A | 2/1988 | Sticht |
| D315,094 S | 3/1991 | Blatt |
| 5,024,575 A | 6/1991 | Anderson |
| 5,284,366 A | 2/1994 | Herbermann |
| 5,402,691 A | 4/1995 | Dworkowski |
| 5,733,097 A | 3/1998 | Herbermann |
| 5,746,566 A | 5/1998 | Herbermann |
| 5,909,998 A | 6/1999 | Herbermann |

OTHER PUBLICATIONS (Exhibit 1)—Various locking quick connect handles manufactured by CPI and Carr Lane Manufacturing Co.
(Exhibit 2)—System provided to Ford Motor Company by Erie Manufacturing.
(Exhibit 3)—Cantilever mounted systems by CPI and ISI.
(Exhibit 4)—Various stampaing press structure and tooling manufactured by CPI.
(Exhibit 5)—German language text of Matthais Fath Paper.

*Primary Examiner*—Donald W. Underwood
(74) *Attorney, Agent, or Firm*—Carlson, Gaskey & Olds

(57) ABSTRACT

An improved tool mount structure allows the infinite placement of a tool along a generally elongate cylindrical member at an infinite number of locations. The elongate cylindrical member is fixed at each axial end to a generally rigid moving member such as a robotic arm boom or transfer bar. The cylindrical member is fixed in a bracket at one axial end, and into a quick-release mount at an opposed axial end. The cylindrical member may be quickly release from the moving member such that the tool may be easily changed. At the same time, by fixing the cylindrical member at each axial end, a secure rigid connection is provided.

2 Claims, 4 Drawing Sheets

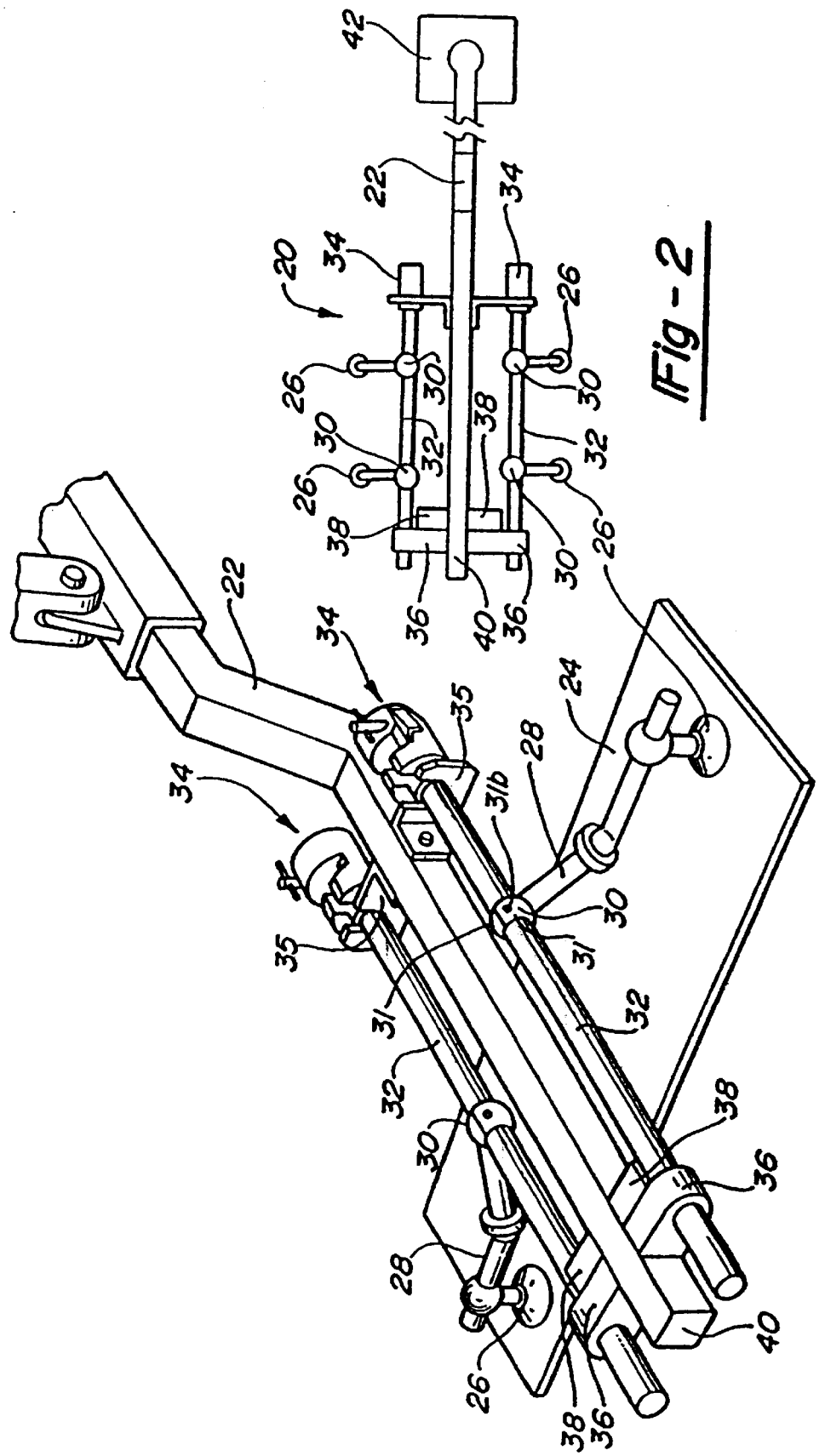

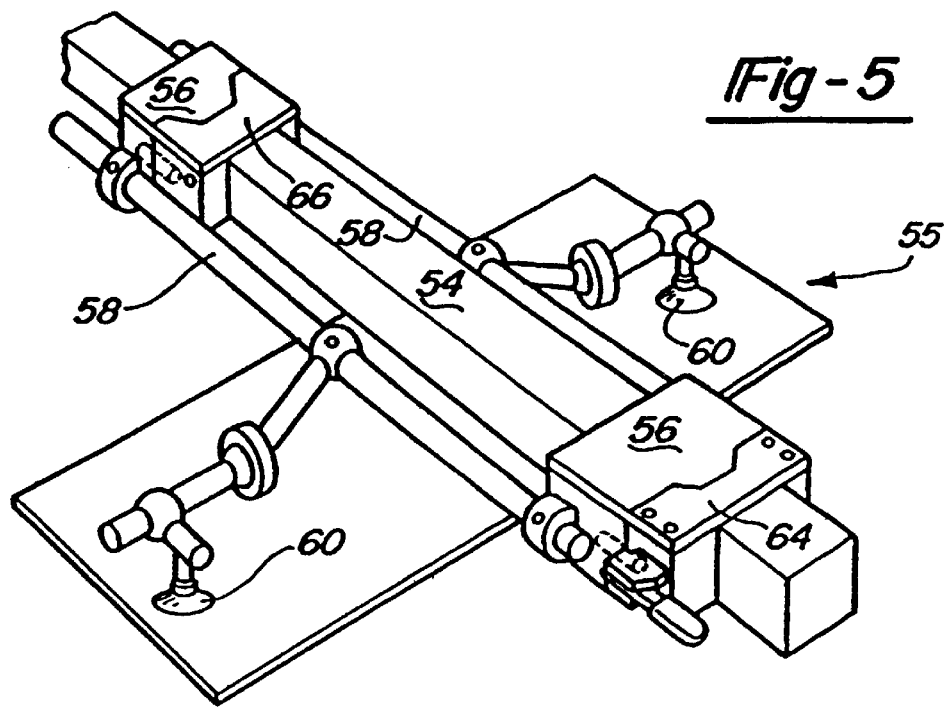
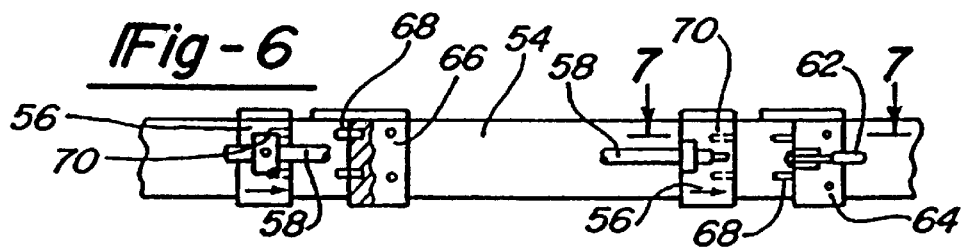
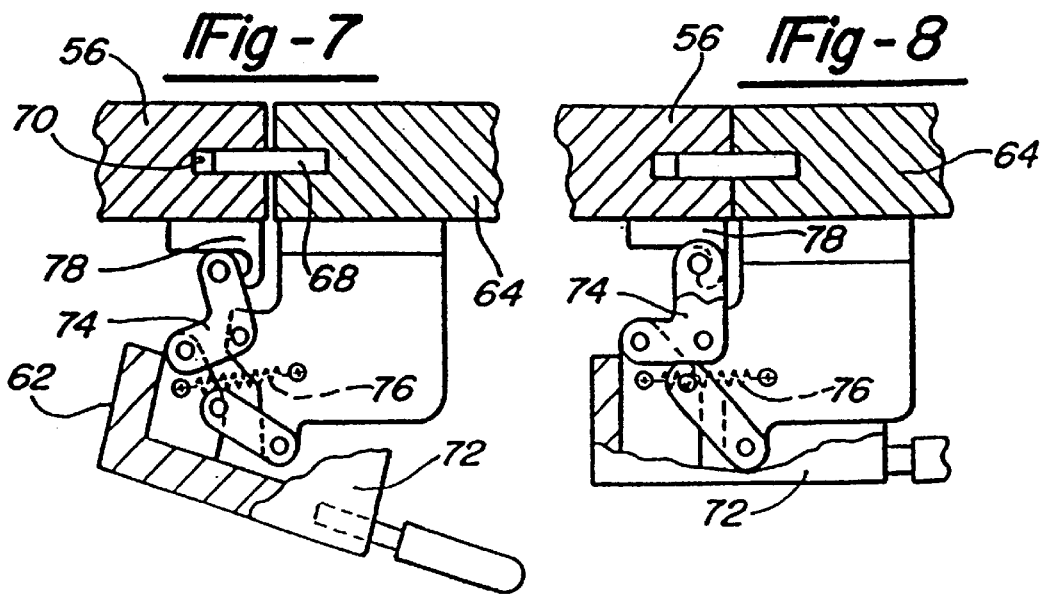

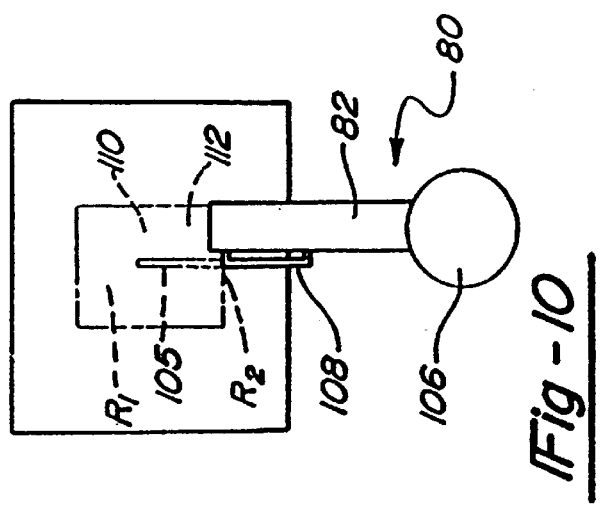
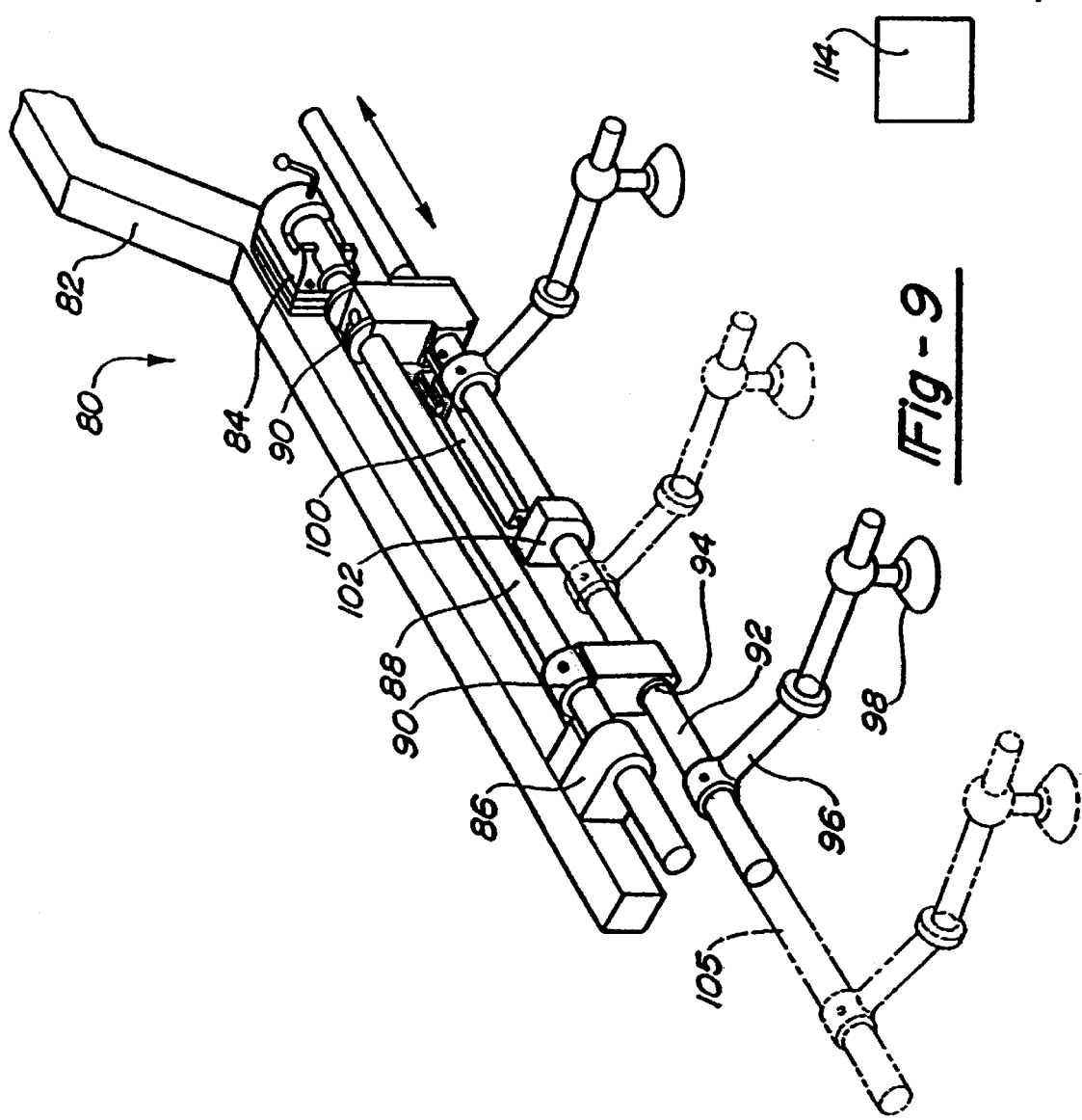

TOOL MOUNT FOR MOVING ELEMENTS

This Application is a continuation of Ser. No. 09/296,163, filed Apr. 21, 1999 (now U.S. Pat. No. 6,244,814), which was in turn a continuation of Ser. No. 09/046,504, filed Mar. 17, 1998 (now U.S. Pat. No. 5,909,998) which was in turn a continuation of application Ser. No. 08/546,940 filed Oct. 23, 1995 (now U.S. Pat. No. 5,746,567) which was in turn a continuation-in-part of U.S. application Ser. No. 08/353,920, filed Dec. 12, 1994 (now U.S. Pat. No. 5,733,097). These applications were all invented by the same inventors as this application.

BACKGROUND OF THE INVENTION

This Application relates to a tool mount structure which allows infinite adjustment of the location of the tool relative to a moving element.

In the prior art, tools are typically mounted to transfer cross bars or robot arms with rigid connections at incrementally spaced locations. In one example, a plurality of bracket locations are spaced at equal distance along the length of a moving cross bar. The tools are selectively mounted to one of those spaced bracket locations. The tool mounts are often very heavy items such that when a tool is removed, a large heavy assembly must be moved to change tools, or move the tools to a different location.

In one other prior art tool mount system, an elongate cylindrical member is attached for movement with a robot arm. The elongate cylindrical member extends from the robot arm to the location of the work. Tools are mounted extending off of the cylindrical member. The cylindrical member is unsupported at its outer end. The tools may sometimes be subject to movement due to the unsupported outer end of the cylindrical member. Moreover, with the elongate cylindrical member attachment, it is somewhat difficult to remove, change or move the tools.

SUMMARY OF THE INVENTION

In a disclosed embodiment of this invention, a generally rigid moving work transfer member such as a robot arm boom, or a cross bar, carries a tool mount structure fixed at two ends to the work transfer member. Preferably, the tool mount structure is a cylindrical rod.

The tools may be mounted at any of an infinite number of locations along the cylindrical rods. Since the cylindrical rod carrying the tools is mounted at two spaced locations, it is maintained rigid. The tools do not tend to move as in the prior art systems.

In other features of this invention, the tools are preferably attached to the cylindrical rod, and the cylindrical rod is preferably attached in a quick-release mount to the sides of the moving transfer members. Thus, the cylindrical rod can be removed with their associated tools as a separate piece. The cylindrical rod and associated tools are relatively lightweight, and thus, easy to transport.

In preferred features of this invention, the cylindrical rods are mounted at one end to a locking bracket that abuts a mating bracket on the moving work transfer member. Pins are formed on one of the brackets and extend into apertures in the other. At the other end of the cylindrical rod, a quick-connect mount structure connects the cylindrical rod to the moving transfer member. In one embodiment, the quick-connect mount member is of the type disclosed in U.S. Pat. No. 5,071,309. Alternatively, other types of mount members may be utilized.

In a further of this invention, a saddle mount for mounting a plurality of the cylindrical rods and associated tools may also be utilized with a robot arm boom. Such a configuration would also preferably use a quick-release mount structure, but would not mount the individual cylindrical rods as separate units relative to the saddle.

These and other features of the present invention can be best understood from the following specification and drawings, of which the following is a brief description.

BRIEF DESCRIPTION OF THE DRAWINGS

FIG. 1A shows a first application of the inventive tool mount system.

FIG. 2 shows a top view of the FIG. 1A system.

FIG. 5 shows another embodiment of the tool mount system of this invention.

FIG. 6 shows a detail of the FIG. 5 embodiment.

FIG. 7 shows yet another detail of the FIG. 5 embodiment.

FIG. 8 shows a final detail of the FIG. 5 embodiment.

FIG. 9 shows an embodiment.

FIG. 10 is a schematic of the FIG. 9 embodiment.

DETAILED DESCRIPTION OF A PREFERRED EMBODIMENTS

Figure 3:
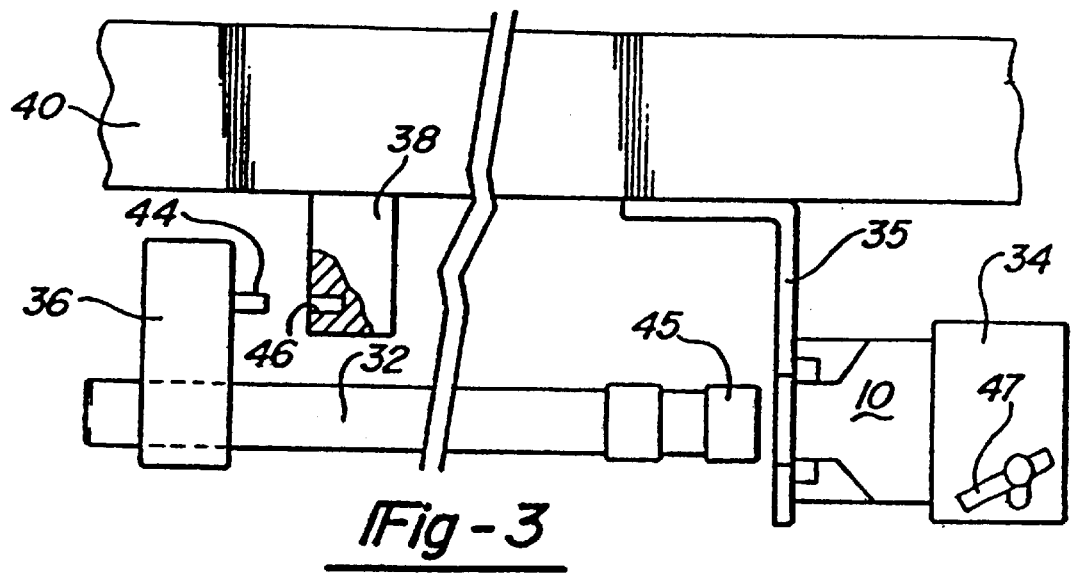
FIG. 3 shows a detail of the tool mount system of the present invention.

FIG. 1A shows a work transfer system 20 incorporating a robot arm boom 22. Robot arm boom is connected to a robotic manipulator that is able to move boom 22 along any one of several axes. in this application, the boom 22 is utilized to move a workpiece 24 between several work stations mounted adjacent to the robot.

Suction cup tools 26 hold the workpiece 24. Although suction cups are disclosed in this invention, it should be understood that the inventive tool mount system has benefits when used with other tools.

Connecting links 28 connect the suction cups 26 to connection locations 30. Connection locations 30 include two clamp halves 31 and bolts 31b that may be tightened to lock the clamp halves, and thus connection member 30 at any location along a cylindrical mount member 32. This infinite adjustability is an improvement over the prior art which only allowed incremental mount locations.

Mount structures 34 mount one end of the cylindrical members 32, into bracket 35, as will be explained in more detail below. A mount bracket 36 secures an oppose end of cylindrical member 32 in a bracket 38 that is fixed to an end portion 40 of boom 22. End portion 40 is preferably a rigid member that is able to easily support the weight of the workpiece 24. Since each axial end of the cylindrical member 32 is fixed and secured to the end portion 40, the connection of the tool 26 is sufficiently rigid that the tool will not move relative to the moving member end portion 40.

Figure 1B:
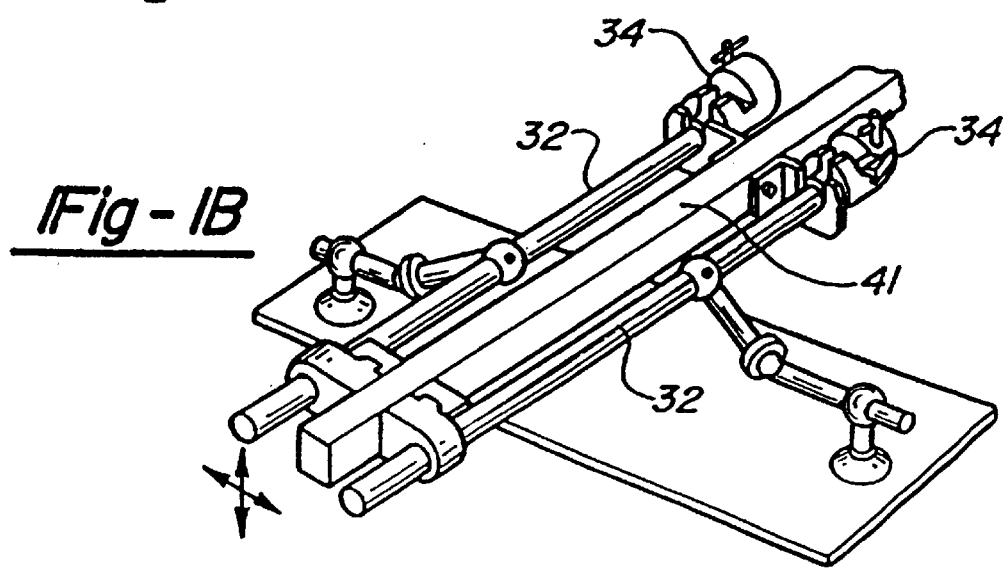
FIG. 1B shows a second application of the inventive mount system.

As shown in FIG. 1B, the tool mount system described in FIG. 1A may also be utilized on moving cross bar 41. A rigid end member 41 mounts the cylindrical member 32 as in the FIG. 1A embodiment. The moving cross bar 41 is typically utilize to move workpieces from one location to a second adjacent location in a plane. The transfer bar 41 typically does not have the freedom of movement of a robotic arm boom such as boom 22. Even so, the inventive tool mount system has the same valuable benefits in the system shown in FIG. 1B.

FIG. 2 is a top view of the FIG. 1A embodiment. As shown, there are a pair of cylindrical members 32, with one mounted on each side of the end portion 40. A robot 42 is shown schematically connected to the boom 22. Boom 22 may be connected to the end member 40 through a breakaway connection, or a single rigid boom and end member 40 may be utilized such as is shown in these embodiments.

FIG. 3 shows a detail of the connection of cylindrical member 32 to the end member 40. As shown, a pin 44 is preferably formed on bracket 36. Pins 44 extend into apertures 46 in bracket 38. At the same time, an opposed end 45 of the cylindrical member 32 fits into a space 46 in the mount structure 34 located on bracket 35. A locking handle 47 locks the end 45 within space 46. A mount such as shown at 34 is described generally in U.S. Pat. No. 5,711,309. An alternative type of mount such as that shown in U.S. Pat. No. 5,284,366, which is shown below at FIGS. 5–8 may also be utilized.

Figure 4:
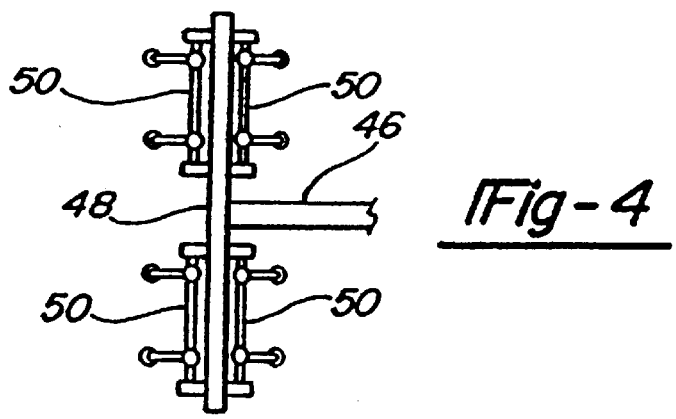
FIG. 4 shows yet another application of the inventive tool mount system.

FIG. 4 shows another embodiment tool mount structure. In this embodiment, the end portion 46 is rigidly connected to a moving rigid T-member 48. Tool mounting cylindrical members 50 are mounted on each side of T-member 48. The tool cylindrical members 50 may be mounted on only one side of T-member, or in any other desired orientation. The tools could be mounted to both portion 46 and member 48.

With the above-described embodiments, the cylindrical members 32 may all be easily and quickly removed from the rigid moving member. Thus, a small lightweight tool mounting assembly including the cylindrical members 32, the bracket 36, the links 28 and the tools 26 may be easily removed from one end of the moving member. This facilitates easy changing of tools, and movement of the tool to another location.

Moreover, the connection 30 may be moved to an infinite number of locations along the length of the cylindrical bar 32. This facilitates the placement of the tool 26 at a desired location for optimum support of the workpiece 24. in the prior art, to achieve infinite adjustment, the unsupported cylindrical members were utilized on their own. This was somewhat undesirable as the tool was not rigidly mounted. The inventive cylindrical members 32 are mounted at each end to a generally rigid moving member and the tools are fully supported.

Another embodiment is shown in FIG. 5. Boom 54 is moved by a robotic manipulator. A saddle structure 55 includes front and rear saddle brackets 56. Saddle brackets 56 extend laterally across boom 54, and support cylindrical members 58 on each lateral side of boom 54. Tools 60 are supported at any location along members 58, as in the above-described embodiments. A mount member 62, may be of the type described generally in U.S. Pat. No. 5,284,366. Alternatively, other mount members including the type described above, or others, may also be utilized with this embodiment. Brackets 64 and 66 mate with saddle brackets 56 to lock the saddle 55 to the moving member 54. The general structure of the saddle is described in more detail in the above-referenced U.S. parent application Ser. No. 08/353,920.

Details of the mount of the saddle 55 to the bar 54 are shown in FIGS. 6–48. As shown, saddle brackets 56 each receive pins 68 from brackets 64 and 66, which extend into opening 70 in the saddle bracket 56. The mount portion 62 includes a handle 72 which is moved between unlocked and locked positions as shown in FIGS. 7 and 8. In the unlocked position shown in FIG. 7, handle 72 includes a rocker arm 74 which is spring biased at 76 to one of two positions. A lip 78 is fixed to bracket 56. When handle 72 is pivoted from the position shown in FIG. 7 to the position shown in FIG. 8, then the bracket 74 is moved to pull the lip 78 to the right from the position shown in FIG. 7, to the locked position shown in FIG. 8. Thus, both saddle brackets 56 will be drawn to the right and into their respective mating bracket portions 64 and 66. Thus, the saddle 55 is secured to the moving boom 54 in a secure fashion.

FIG. 9 shows yet another embodiment incorporating the present invention. System 80 incorporates a moving row boom 82 having a mount structure 84 and a bracket sure 86 mounting a cylindrical rod 88 as in the above described embodiment. However, the tools mounted to cylindrical rod 88 are somewhat different in system 80. Brackets 90 are fixed to cylindrical rod 88, and may be mounted at any position along the length of cylindrical rod 88. Brackets 90 slidably receive a cylindrical rod 92. The bar slides through openings 94 in brackets 90. Links 96 are mounted at any location along the length of cylindrical rod 92, and mount tools 98. An air cylinder 100 is connected to rod 92 through a bracket 102. The air cylinder 100 is fixed to the rear bracket 90, and is actuated to drive bracket 102 and cylindrical rod 92 forwardly. A control is connected to a control on the robot to actuate the cylinder when desired. Guards could be used to prevent rotation of the cylinder rod. The air cylinder moves rod 92. Thus, the system 80 may have the cylinder 100 actuated to move the cylindrical rod 92, and hence tools 98 forwardly to the position 105 shown in phantom.

As shown in FIG. 10, a robot 106 may mount the moving tool structure, shown here schematically as 108, forwardly. A workpiece 110 may be held by the tools on the work holder 108. A work area 112, which may consists of a large machine, receives the workpiece 110.

With the above described invention, the robot boom 82 may be turned to a position such as shown in FIG. 10 from the location of 114 where it may receive the workpiece 110. Once the boom 82 has arrived at the position shown in FIG. 10, the work holder 108 may be advanced forwardly to the position 105 shown in phantom. In this position, the workpiece 110 is delivered into the work area or machine 112. Without the ability to move the tool holding member 108 forwardly to the position 105, then the radius required for the movement between locations 114 and 112 would be that shown at $R_1$. Instead, due to the moveability of the work holder 108, a smaller radius $R_2$ is all that is required. In addition, during the movement the tool is more firmly supported than the prior art tools. With this invention, the boom 182 is moved between a location 114, where it may be extended to pick up a workpiece, or need not be extended. The workpiece is lifted, boom 82 is returned to the position shown in FIG. 10, a control moves member 108 forwardly to position 105, and the workpiece is left within the work area 112.

Preferred embodiments of this invention have been disclosed, however, a worker of ordinary skill in the art would recognize that certain modifications will come within the scope of this invention. For that reason, the following claims should be studied to determine the true scope and content of this invention.

What is claimed is:

1. A tool mounting system for mounting tools on a moving member comprising:

a moving boom member fixed to a robotic manipulator to move said moving boom member and move tools fixed to said moving boom member; and at least one generally elongate tool mount fixed at each axial end to said moving boom member, and drive structure for driving said elongate tool mount forward of said moving member during selected periods of its operation cycle and also for retracting said elongate tool mount.

2. A tool mounting as recited in claim 1, wherein said elongate tool mount includes a moving member received in a fixed guide member, and said drive structure includes a fluid cylinder fixed between said moving member and said fixed guide member for driving said moving member forwardly.

* * * * *